(12) United States Patent
Jonkman (10) Patent No.: US 9,197,339 B2
(45) Date of Patent: Nov. 24, 2015

(54) ISOLATOR DEVICE FOR PASSING THROUGH A SIGNAL

(75) Inventor: Willemjan Johannes Jonkman, Joure (NL)

(73) Assignee: ASTREA INTELLECTUEEL EIGENDOMSRECHT B.V., Joure (NL)

( * ) Notice: Subject to any disclaimer, the term of this patent is extended or adjusted under 35 U.S.C. 154(b) by 193 days.

(21) Appl. No.: 14/007,620

(22) PCT Filed: Mar. 26, 2012

(86) PCT No.: PCT/NL2012/050189
§ 371 (c)(1),
(2), (4) Date: Dec. 6, 2013

(87) PCT Pub. No.: WO2012/134274
PCT Pub. Date: Oct. 4, 2012

(65) Prior Publication Data
US 2014/0086038 A1 Mar. 27, 2014

(30) Foreign Application Priority Data
Mar. 25, 2011 (NL) ...................................... 2006468
Mar. 30, 2011 (NL) ...................................... 2006494

(51) Int. Cl.
*H04L 12/26* (2006.01)
*H04J 1/12* (2006.01)
*H04L 12/28* (2006.01)
*H04L 12/931* (2013.01)
*H04R 27/00* (2006.01)

(52) U.S. Cl.
CPC . *H04J 1/12* (2013.01); *H04L 12/28* (2013.01); *H04L 43/08* (2013.01); *H04L 49/40* (2013.01); *H04R 27/00* (2013.01)

(58) Field of Classification Search
None
See application file for complete search history.

(56) References Cited

U.S. PATENT DOCUMENTS

| | | | | |
|---|---|---|---|---|
| 4,107,464 A | * | 8/1978 | Lynch et al. | 381/80 |
| 4,569,221 A | * | 2/1986 | Snook, Jr. | 73/1.61 |
| 4,656,318 A | * | 4/1987 | Noyes | 379/102.04 |
| 4,689,801 A | * | 8/1987 | Nurczyk et al. | 375/223 |
| 4,723,292 A | * | 2/1988 | Taylor | 381/56 |
| 4,724,478 A | * | 2/1988 | Masuko et al. | 725/119 |

(Continued)

FOREIGN PATENT DOCUMENTS

| | | |
|---|---|---|
| DE | 3627960 C1 | 9/1987 |
| DE | 3723737 C2 | 1/1988 |

(Continued)

*Primary Examiner* — Bunjob Jaroenchonwanit
(74) *Attorney, Agent, or Firm* — Tyler J. Sisk; Casimir Jones, S.C.

(57) ABSTRACT

Isolator devices for a class A evacuation system are provided. The isolators each have specific address in the system. This allows the isolators to report individually with address information and status information, for example related to errors in the system and the device in particular. In an embodiment, a speaker can be connected to the device. This allows the speaker to be addressed individually so dedicated information like alarms and spoken messages can be sent to specific speakers. Dedicated isolators are available for announcing, powering the network and routing network traffic. Routers provide a possibility to create multiple loops, reducing wiring and increasing redundancy. By sending data in different branches by means of spread spectrum modulation, more data can be sent and effects of crosstalk between branches is highly reduced.

21 Claims, 6 Drawing Sheets

(56) References Cited

U.S. PATENT DOCUMENTS

| | | | |
|---|---|---|---|
| 7,092,412 B1* | 8/2006 | Rezvani et al. | 370/536 |
| 7,113,121 B1* | 9/2006 | Sutardja et al. | 341/144 |
| 7,511,515 B2* | 3/2009 | Herbold | 324/691 |
| 7,706,392 B2* | 4/2010 | Ghoshal et al. | 370/419 |
| 7,843,670 B2* | 11/2010 | Blaha et al. | 361/18 |
| 8,064,179 B2* | 11/2011 | Apfel | 361/90 |
| 8,693,497 B2* | 4/2014 | Wei et al. | 370/466 |
| 8,972,524 B2* | 3/2015 | Richeson et al. | 709/217 |
| 9,013,980 B2* | 4/2015 | Lontka | 370/221 |
| 2003/0144848 A1* | 7/2003 | Roy et al. | 704/500 |
| 2006/0077891 A1* | 4/2006 | Smith et al. | 370/220 |
| 2006/0290208 A1* | 12/2006 | Chang et al. | 307/116 |
| 2007/0035407 A1* | 2/2007 | Capowski et al. | 340/679 |
| 2007/0201170 A1* | 8/2007 | Hooper | 361/42 |
| 2008/0170495 A1* | 7/2008 | Monse et al. | 370/223 |
| 2008/0253392 A1* | 10/2008 | Diab | 370/466 |
| 2009/0140579 A1* | 6/2009 | Chang et al. | 307/126 |
| 2011/0025341 A1* | 2/2011 | Lupaczyk et al. | 324/509 |
| 2011/0026411 A1* | 2/2011 | Hao | 370/249 |
| 2011/0254366 A1* | 10/2011 | Borchers | 307/1 |
| 2012/0242168 A1* | 9/2012 | Tsai et al. | 307/112 |
| 2014/0372773 A1* | 12/2014 | Heath et al. | 713/300 |

FOREIGN PATENT DOCUMENTS

| | | |
|---|---|---|
| EP | 0967833 A2 | 12/1999 |
| EP | 1802175 A1 | 6/2007 |
| EP | 2017803 A1 | 1/2009 |
| GB | 2199466 A | 7/1988 |
| WO | 03/013041 A2 | 2/2003 |
| WO | 2006/050754 | 5/2006 |

* cited by examiner

Fig. 6 C

ISOLATOR DEVICE FOR PASSING THROUGH A SIGNAL

TECHNICAL FIELD

The invention relates to devices for passing through a signal and in particular to devices for setting up a network for use as evacuation systems.

BACKGROUND

Emergency evacuation systems in accordance with class A comprise signalling devices wired in a loop comprising a signalling line. In case of evacuation, the loop is provided with an evacuation signal from a base station. The loop comprises isolator devices like the Astrea isolator type ASB-11 till 22. The isolator devices are connected by the signalling line. The loop wiring comprises two conductors like a pair of wires or a coax cable. The loop wiring is interrupted by the isolator. The isolator receives a signal on a receiving module via the signalling line.

Upon reception of the signal, the signal is retransmitted via a sending unit. The quality of the signal sent out is tested. In case the quality of the signal does not meet certain quality standards with respect to for example voltage and/or current, the sending of the signal is interrupted as an out of spec voltage and/or current may indicate a short or open in a signalling line that is part of the loop. Subsequently, the loop is fed from the other side via signalling lines in the loop that are still in good state. The loop is set up as a single loop, over which one analogue audio signal is provided

SUMMARY

It is preferred to have an improved device with more functionality.

In a first aspect, a router for an evacuation system is provided. The router comprises a first router input/output module comprising a first pair of router terminals for connecting a first signalling line and a second router input/output module comprising a second pair of router terminals for connecting a second signalling line. The router further comprises a first router modem connected to the first router input/output module via a first coupling; a second router modem connected to the second router input/output module via a second coupling and a router processing unit connected to the first router modem and the second router modem for communicating data via the first router modem and the second router modem. The router processing unit being arranged to instruct the first router modem to modulate the data in a first frequency spectrum; and instruct the second router modem to modulate the data in a second frequency spectrum not overlapping with the first frequency spectrum. The first coupling comprises a first primary connection connected to the first pair of terminals and a first secondary connection connected to the first router modem, the first primary connection being galvanically separated from the first secondary connection and the coupling being arranged for enabling the first router modem to receive a data signal available on the first signalling line that is filtered from a supply signal. Alike, the second coupling comprises a second primary connection connected to the second pair of terminals and a second secondary connection connected to the second router modem, the second primary connection being galvanically separated from the second secondary connection and the coupling being arranged for enabling the second router modem to receive a data signal available on the second signalling line that is filtered from a supply signal.

By sending data in different and disjoint frequency bands, effects of cross-talk are highly reduced; the first frequency spectrum has no influence on the second frequency spectrum. There may be an issue if the first frequency spectrum is lower and important harmonics are dominantly present in the second frequency spectrum. By using proper modulation techniques, this may be reduced or mitigated. Furthermore, by means of proper modulation, multiple data channels may be provided simultaneously over a signalling line.

Furthermore, because of the galvanic separation, data processing part of the router is galvanically separated from the power part of the router and from the terminals of the router. This means that power anomalies and other anomalies in the network like shorts and opens, do not have a large effect or no effect at all on the usually sensitive data processing electronics. This creates a robust device, which is important in evacuation systems. It is noted that embodiment works as well when the first router modem and the second router modem do not modulate/demodulate and send/receive data in non-overlapping frequency spectra.

In an embodiment, the first coupling and the second coupling have a high-pass filter characteristic.

By using a high-pass filter, a data signal may be superimposed on a supply voltage signal, providing a small-signal data modulation of a large signal supply signal. As long as the frequency of the supply signal is considerably lower than the frequency of the first spectrum and the second spectrum, the data can be well filtered out from the supply signal. Use of a direct current supply voltage is in this case particularly advantageous.

Another embodiment of the router comprises a power supply module for providing electrical energy from the evacuation system to the router connectable to the first router input/output module and to the second router input/output module for obtaining electrical energy therefrom. The router further comprises a first switch between the first pair of router terminals and the power supply module; and a second switch between the second pair of router terminals and the power supply.

If anomalies occur in the evacuation system at the first pair of router terminals or the second pair of router terminals, this embodiment allows that pair of terminals to be isolated by opening the applicable switch. This is particularly advantageous in case of shorts and/or opens in a signalling line connected to that pair of routers, but is also advantageous in case of anomalies in data traffic. It is noted that embodiment works as well when the first router modem and the second router modem do not modulate/demodulate and send/receive data in non-overlapping frequency spectra. In that case, the router would comprise the components of this embodiment, though it would be irrelevant whether the router processing unit would be arranged to instruct the modems to modulate/demodulate and send/receive data in non-overlapping frequency spectra.

Yet a further embodiment comprises a router power monitoring unit for monitoring a first voltage level over the first pair of router terminals and a second voltage level over the second pair of router terminals. In the router the power monitoring unit is operatively coupled to the router processing unit for providing the router processing unit with information on the first voltage level and the second voltage level; and the router processing unit is arranged to open the first switch if the first voltage level is below a first voltage threshold and to open the second switch if the second voltage level is below a second voltage threshold.

In other words: the router also acts as an isolator device, comprising a first terminal for receiving a signal; a second terminal for sending the received signal; a signal quality monitoring module for monitoring the quality of the signal sent by via the second terminal; a pass through module for passing the signal through from the first terminal to the second terminal; and a control module arranged to: receive information from the signal integrity monitoring module; instruct the pass through module to pass through the signal received from the first terminal to the second terminal if the quality of the signal sent by means of the second terminal meets pre-determined criteria; and instruct the pass through module not to pass through the signal from the first terminal to the second terminal if the quality of the signal sent by means of the second terminal does not meet pre-determined criteria.

In this way, terminals that are connected to devices and/or signalling lines where anomalies occur, likes shorts and opens, are directly isolated from the router and other devices that are connected to the router in a network. This increases quality and integrity of the network. It is noted that embodiment works as well when the first router modem and the second router modem do not modulate/demodulate and send/receive data in non-overlapping frequency spectra. In that case, the router would comprise the components of this embodiment, though it would be irrelevant whether the router processing unit would be arranged to instruct the modems to modulate/demodulate and send/receive data in non-overlapping frequency spectra.

In again another embodiment, a first router terminal of the first pair of router terminals is conductively connected to a first router terminal of the second pair of router terminals and a second router terminal of the first pair of router terminals is conductively connected to a second router terminal of the second pair of router terminals and the first voltage threshold is equal to the second voltage threshold.

This embodiment enables unobstructed flow of a direct current from the first pair of terminals to the second pair of terminals, providing a supply of electrical energy for the whole system, including the router, by means of the power supply module.

In yet another embodiment, the first router modem is connected to the first pair of router terminals between the first pair of router terminals and the first switch and the second router modem is connected to the second pair of router terminals between the second pair of router terminals and the second switch.

If anomalies occur and a pair of terminals is isolated, data may still be retrieved from that pair of terminals, while a power supply and consumption part of the device has been isolated from at least part of the evacuation system. This embodiment works particularly well with the embodiment where the modems are connected to the terminals by means of an inductive coupling, because of the galvanic separation between the terminals and the modems. It is noted that embodiment works as well when the first router modem and the second router modem do not modulate/demodulate and send/receive data in non-overlapping frequency spectra. In that case, the router would comprise the components of this embodiment, though it would be irrelevant whether the router processing unit would be arranged to instruct the modems to modulate/demodulate and send/receive data in non-overlapping frequency spectra.

Again a further embodiment comprises a second pair of router terminals for connecting a third signalling line; and a third router modem connected to the third router input/output module; the router processing unit being connected to the third router modem and further arranged to instruct the third router modem to modulate the data in a third frequency spectrum not overlapping with the first frequency spectrum and the second frequency spectrum.

With this embodiment, a network can be created with multiple loops, which increases redundancy of the network. Furthermore, less wiring is required for building a network in a building where separate loops are required. With conventional single-loop evacuation network systems, a loop had to be provided from the ground floor to each alarmzone, individually. With this embodiment, two routers are provided in each area, where a loop is made from a first of these two routers to a second of these two routers. In this way, one main loop is required from ground floor to top floor and sub-loops are provided at each floor.

And as discussed before, using disjoint spectrums for data communication reduces or even mitigates consequences of cross-talk.

In a second aspect, a device for forming part of an evacuation announcement network. The device comprises: a first input/output module comprising a first pair of terminals for connecting a first signalling line, a second input/output module comprising a second pair of terminals for connecting a second signalling line, a modem coupled to the first input/output module via a first coupling and the second input/output module via a second coupling and a processing unit connected to the messaging modem for communicating data via the messaging modem. The first coupling comprises a first primary connection connected to the first pair of terminals and a first secondary connection connected to the modem and the second coupling comprising a second primary connection connected to the second pair of terminals and a second secondary connection connected to the modem, the primary connections being galvanically separated from the secondary connections and the couplings being arranged for enabling the modem to receive a data signal available on the first signalling line and/or the second signalling line that is filtered from a supply signal. A first terminal of the first pair of terminals is connected to a first terminal of the second pair of terminals and a second terminal of the first pair of terminals is connected to a second terminal of the second pair of terminals via a first switch.

This device is particularly well suited for setting up an evacuation network system with the router according to the first aspect. This works particularly well with the modem being configured to send, receive, modulate and demodulate data and data signals in the first spectrum and the second spectrum. Furthermore, this device isolates terminals if an anomaly is detected at those terminals.

A third aspect provides an evacuation network system comprising a first router according to the first aspect and a second router according to the first aspect, a first device according to the second aspect as a first messaging device and a second device according to the second aspect as a second messaging device and at least one device according to the second aspect as a network power device. The first router input/output module of the first router is connected to the first messaging input/output module of the first messaging device via a signalling line for communicating data in the first frequency spectrum, the second messaging input/output module of the first messaging device is connected to the first router input/output module of the second router via a signalling line for communicating data in the first frequency spectrum and the second router input/output module of the second router is connected to the first power input/output module of the network power device via a signalling line for communicating data in the second frequency spectrum and for powering the elements of the network. Furthermore, the second power input/output module of the network power device is connected to the first messaging input/output module of the second messaging device via a signalling line for communicating data in the second frequency spectrum and for powering the elements of the network; and the second messaging input/output module of the second messaging device is connected to the second router input/output module of the first router via a signalling line for communicating data in the second frequency spectrum.

BRIEF DESCRIPTION OF THE DRAWINGS

The invention will now be discussed in further detail by means of Figures. In the Figures,
FIG. 6 A shows: a first signal spectrum;
FIG. 6 B shows: a second signal spectrum;
and
FIG. 6 C shows: a third signal spectrum;

DETAILED DESCRIPTION

Figure 1:
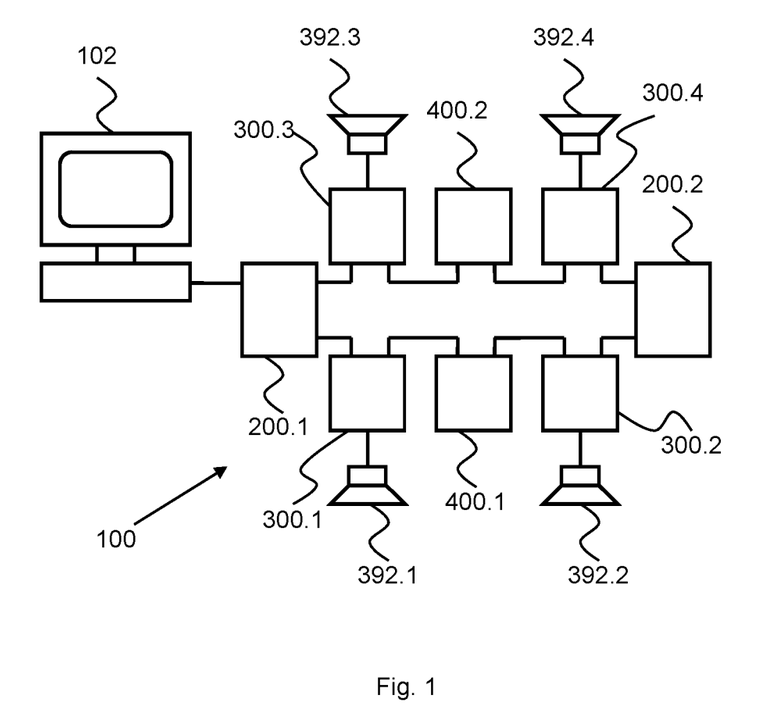
FIG. 1 shows: a first evacuation network system.

FIG. 1 shows an evacuation network system 100 comprising a first announcement device 300.1 having a first speaker 392.1 connected thereto, a second announcement device 300.1 having a second speaker 392.1 connected thereto, a third announcement device 300.1 having a third speaker 392.1 connected thereto and a fourth announcement device 300.1 having a fourth speaker 392.1 connected thereto.

Between the first announcement device 300.1 and the second announcement device 300.2, a first power supply device 400.1 is provided. Between the second announcement device 300.2 and the fourth announcement device 300.4, a second hub device 200.2 is provided. Between the fourth announcement device 300.4 and the third announcement device 300.3, a second power supply device 400.2 is provided. Between the third announcement device 300.3 and the first announcement device 300.1, a first hub device 200.1 is provided.

In this embodiment, the first hub device 200.1 has a computer 102 connected to it for providing data to the evacuation network system 100. Such data can be computer executable instructions for programming the evacuation network system 100, audio data intended for reproduction by one or more of the various speakers 392 comprised by the evacuation system, other data or a combination thereof.

The various devices of the evacuation network system 100 are connected in a loop by means of signalling lines between adjacent devices. The signalling lines are preferably provided by pairs of electrical conductors, either in parallel as a pair of wires or coaxially with a central conductive wire, surrounded by an insulating cladding which is clad by a conductor again.

Figure 2:
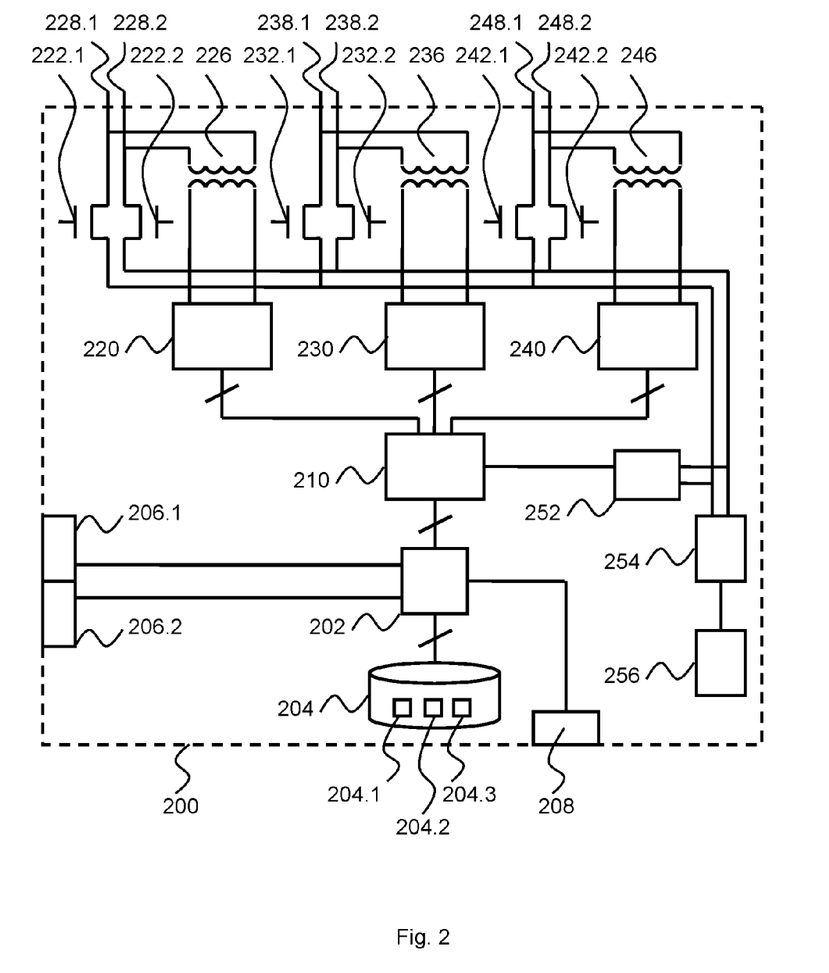
FIG. 2 shows: a hub device.

FIG. 2 shows a hub device 200 in further detail. The hub device 200 comprises a first signal input/output module comprising a first pair of terminals 228 comprising a first terminal 228.1 and a second terminal 228.1 and a first switch 222 comprising a first transistor 222.1 and a second transistor 222.2. The transistors 222 are preferably provided as MOSFETs. The first pair of terminals 228 is connected to a first modem 220 connected to it, acting as a first transceiver for receiving and sending data via the first signal input/output module. The first modem 220 is connected to the first pair of terminals 228 via a first inductive coupling 226.

The modem 220 preferably comprises the INT6400 and INT1400 circuits of Intellon. This combination of circuits receives a physical signal and provides information at MAC level for further processing by further components of the hub device 200.

The hub further comprises a second signal input/output module comprising a second pair of terminals 238 comprising a first terminal 238.1 and a second terminal 238.1 and a second switch 232 comprising a first transistor 232.1 and a second transistor 232.2. The transistors 232 are preferably provided as MOSFETs. The second pair of terminals 238 is connected to a second modem 230 connected to it, acting as a second transceiver for receiving and sending data via the second signal input/output module. The second modem 230 is connected to the second pair of terminals 238 via a second inductive coupling 236.

The hub further comprises a third signal input/output module comprising a third pair of terminals 238 comprising a first terminal 238.1 and a second terminal 238.1 and a third switch 242 comprising a first transistor 232.1 and a second transistor 232.2. The transistors 232 are preferably provided as MOSFETs. The third pair of terminals 238 is connected to a third modem 230 connected to it, acting as a third transceiver for receiving and sending data via the third signal input/output module. The third modem 230 is connected to the third pair of terminals 238 via a third inductive coupling 236.

The first modem 220, the second modem 230 and the third modem 240 receive signals with modulated data via the first signal input/output module, the second signal input/output module and the third signal input/output module, respectively. The first modem 220, the second modem 230 and the third modem 240 demodulate the data from the received signals and provide the demodulated data to a hub processing unit 202 via a data switch 210. This configuration enables the hub device 200 to also function as a router. For sending data through any of the pairs of terminals, the first modem 220, the second modem 230 and the third modem 240 modulate the data to be sent for superposition on a signal already present on a signalling line connected to a respective pair of terminals. Alternatively, data is sent and/or received without modulation and provided to the pairs of terminals as a baseband signal for superposition on a signal already present on a signalling line connected to a respective pair of terminals.

The hub processing unit 210 is arranged for controlling the operation of the various components of the hub device 200 and connected to a mass storage module 204 comprising a RAM memory 204.1, a Flash memory 204.2 and a Flash storage 204.3. This first comprises a volatile memory, the latter two comprise non-volatile memories. Data to be stored in the Flash storage 204.3 is first stored in the Flash memory 204.2. Subsequently, data is stored in the Flash storage 204.3. This way of storing data in the Flash storage ensures data integrity in case of a sudden power down of the hub device 200. Data stored can be computer executable instructions for programming the hub processing unit 202 and for storing other data related to the hub device, like a unique identifier identifying the hub device 200 in the evacuation network system 100.

The hub processing unit 210 is further connected to a dual network device 206 comprising a first network interface 206.1 and a second network interface 206.2. The dual network device 206 enables the hub device 200 to communicate with other devices like the personal computer 102 as shown by FIG. 1. The communication is preferably done over an Ethernet protocol or a similar protocol.

The hub processing unit 210 is also connected to a general input/output module 208. The general input/output module 208 is arranged for communicating to a wide range of devices and may comprise various connectors and controllers, like a USB socket and controller, an RS-232 socket and controller, an IEEE 1384 socket and controller, a Bluetooth transceiver and controller, an IEEE 802.11 transceiver and controller, other, or a combination thereof.

As shown by FIG. 2, the terminals of the signal input/output modules are connected in parallel: the first terminal 228.1 of the first pair of terminals 228 is connected to the first terminal 238.1 of the second pair of terminals 238 and the first terminal 248.1 of the third pair of terminals 248. The second terminal 228.2 of the first pair of terminals 228 is connected to the second terminal 238.2 of the second pair of terminals 238 and the second terminal 248.2 of the third pair of terminals 248. The connections are electrically conductive.

The first terminals and the second terminals are connected to a power supply module 254. The power supply module 254 is arranged for providing the various elements of the hub device 200 with electrical energy. The electrical energy is obtained via the first, second and/or third input/output module connected to the evacuation network system 100, the voltage is buffered and regulated and subsequently provided to the various elements of the hub device 200. The power supply module 254 is also connected to an energy storage 256 for providing backup energy in case the power supply module 254 does not receive any energy from the evacuation network system 100. The energy storage 256 may comprise a battery, a capacitor, another energy storage device, or a combination thereof.

The first terminals and the second terminals are also connected to a power control unit 252. The power control unit 252 is arranged for measuring and monitoring voltages over the pairs of terminals of the input/output modules. Additionally or alternatively, the power control unit 252 is arranged for monitoring a current level through any of the terminals of the hub device 200. The power control unit 252 measures the voltages over the terminals and compares the measures values with a lower threshold value and/or an upper threshold value. In one embodiment, different threshold values may apply to different pairs of terminals. As in the embodiment depicted by FIG. 2 terminals are conductively connected in two groups with one conductor from each input/output module, the voltages over the pairs of terminals are the same for each input/output terminal. Therefore, for this embodiment, the measured voltage is compared with one upper threshold value and one lower threshold value.

If the measured voltage is above the upper threshold or below the lower threshold, this may indicate an erroneous situation in the evacuation network system 100. In particular if the measured voltage is below the lower threshold, this may indicate a short in a signalling line. Therefore, upon detecting the measured voltage to drop below the lower threshold, the first switch 222, the second switch 232 and the third switch 242 are opened, conductively disconnecting the first pair of terminals 228, the second pair of terminals 238 and the third pair of terminals 248 from the other elements of the hub device 200.

As the conductive couplings to the modems is connected to the terminals between the switches and the terminals, the inductive coupling between the modems and the terminals is maintained. Alternatively, the inductive couplings are provided between the switches and the power supply module 254 to fully disconnect the modems from the terminals in case of an erroneous situation. It is noted that with the architecture as depicted by FIG. 2, still data may be received by the modems via the inductive couplings.

In the architecture as depicted by FIG. 2, it cannot be directly detected at which pair of terminals a short occurs. To properly detect the short after opening all switches, first the first switch 222 is closed. If the measured voltage drops, the first switch is opened again. Subsequently, the second switch 232 is closed. If the measured voltage drops, the second switch is opened again. Subsequently, the third switch 242 is closed. If the measured voltage drops, the third switch is opened again. By closing—and in case required, opening—the three switches, a pair of terminals where an erroneous situation occurs can be detected and isolated.

For this sequence, the power supply module 254 measures the voltage, compares the voltage and in case an anomaly occurs, informs the hub processing unit 202 on the anomaly. Subsequently, the hub processing unit 202 may instruct the power supply module 254 to open the switches in case action is required. This may be done directly or via the power supply module 254. By following this sequence, a pair of terminals with a short between two terminals can be efficiently isolated.

Figure 3:
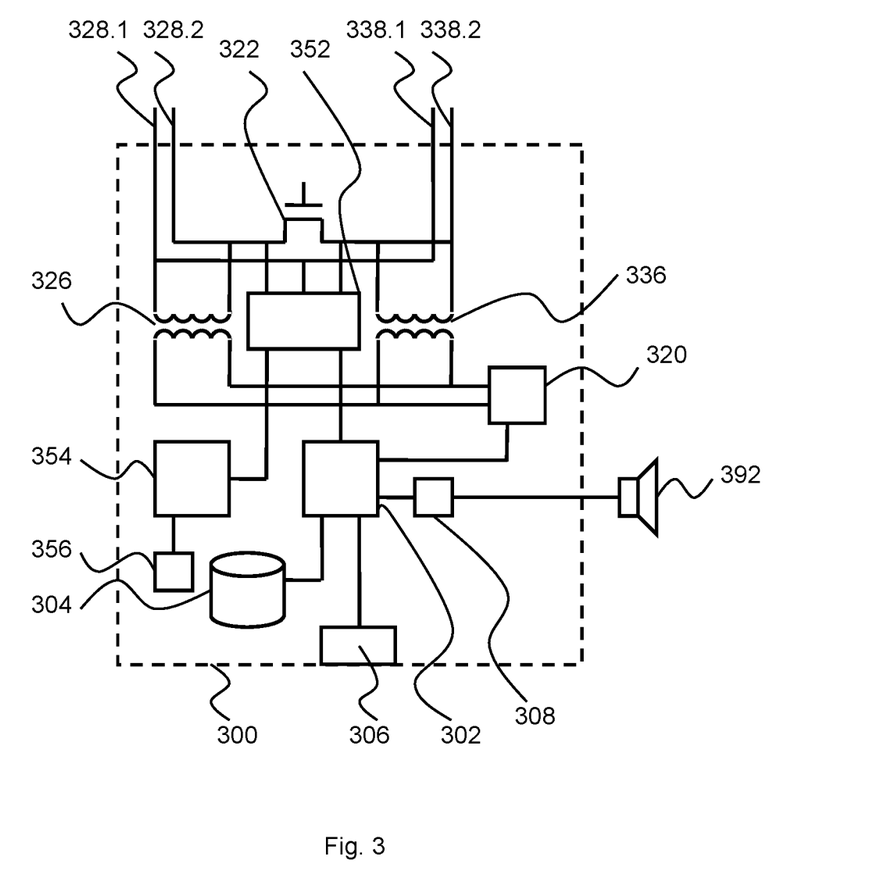
FIG. 3 shows: an announcement device.
Figure 4:
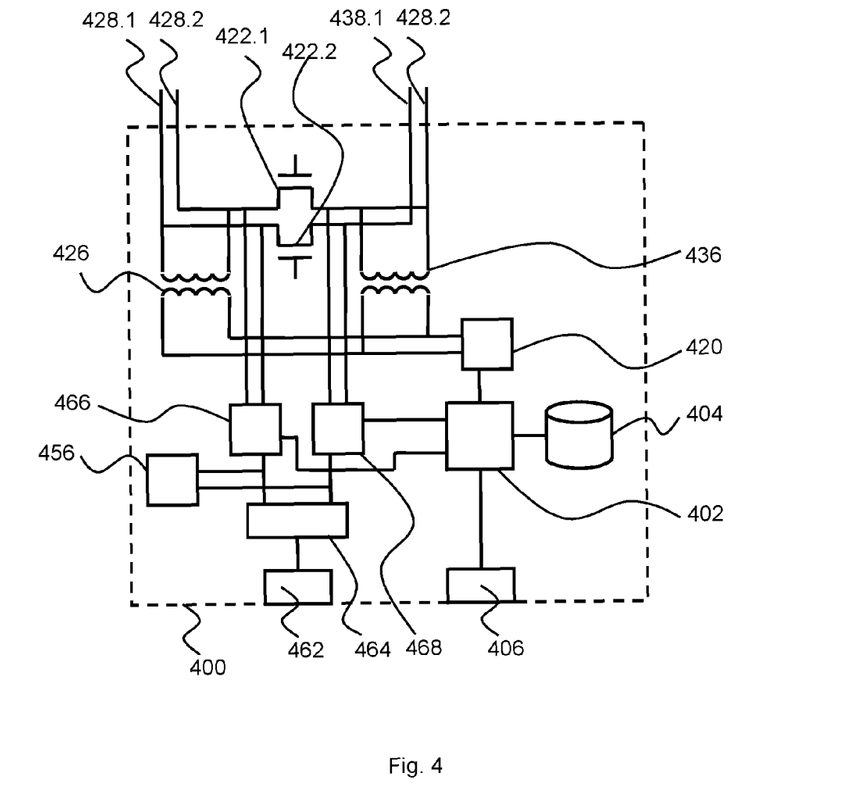
FIG. 4 shows: a power supply device.

The further operation of the hub device 200 will be discussed after further detailed views of the announcement device 300 and the power supply device 400 have been discussed.

FIG. 3 shows an announcement device 300. The announcement device 300 comprises a first pair of terminals 328 with a first terminal 328.1 and a second terminal 328.2 and a second pair of terminals 338 with a first terminal 338.1 and a second terminal 338.2. The first terminals of the pairs are directly conductively connected and the second terminals of the pairs are conductively connected via a MOSFET 322 acting as a switch. Alternatively, also the first terminals are connected via a switch. A first inductive coupling 326 is connected to the first pair of terminals 328 and a second inductive coupling 336. A modem 320 for modulating and demodulating a signal comprising data is connected to both pairs of terminals via both conductive couplings.

The announcement device 300 further comprises a power control unit 352. The power control unit 352 is arranged for measuring and monitoring voltages over the pairs of terminals. The power control unit 352 is connected to the first terminals of the pairs of terminals and to the second terminals of the pairs of terminals. As the second terminals are connected via the MOSFET 322 that may be in an open non-conductive state, the power control unit 352 is connected to the second terminals at both sides of the MOSFET 322.

The power control unit 352 measures the voltages over the terminals and compares the measures values with a lower threshold value and/or an upper threshold value. In one embodiment, different threshold values may apply to different pairs of terminals.

As in the embodiment depicted by FIG. 3 terminals are conductively connected in two groups with one conductor from each input/output module, the voltages over the pairs of terminals are the same for each pair of terminals. Therefore, for this embodiment, the measured voltage is compared with one upper threshold value and one lower threshold value.

If the measured voltage is above the upper threshold or below the lower threshold, this may indicate an erroneous situation in the evacuation network system 100. In particular if the measured voltage is below the lower threshold, this may indicate a short in a signalling line. Therefore, upon detecting the measured voltage to drop below the lower threshold, the MOSFET 322 is switched off. In this way, first pair of terminals 328 is isolated from the second pair conductors 338.

In another embodiment, another switch like a second MOSFET can also be provided between the first terminals of the pairs of terminals for fully separating the first pair of terminals 328 from the second pair of terminals 338. As the conductive couplings to the modems is connected to the terminals between the switches and the terminals, the inductive coupling between the modems and the terminals is maintained. The second MOSFET may not be required if the various components of the evacuation network system 100 are provided in an electrically floating manner, i.e. isolated from an earth terminal.

The power control unit 352 is connected to an announcement processing unit 302 and a power supply module 354. The power supply module 354 is arranged for providing the various elements of the announcement device 300 with electrical energy. The electrical energy is obtained via the first, second and/or third input/output module connected to the evacuation network system 100, the voltage is buffered and regulated and subsequently provided to the various elements of the announcement device 300. The power supply module 354 is also connected to an energy storage 356 for providing backup energy in case the power supply module 354 does not receive any energy from the evacuation network system 100. The energy storage 356 may comprise a battery, a capacitor, another energy storage device, or a combination thereof.

The announcement processing unit 302 is connected to a general input/output module 306. The general input/output module 306 is arranged for communicating to a wide range of devices and may comprise various connectors and controllers, like a USB socket and controller, an RS-232 socket and controller, an IEEE 1384 socket and controller, an RJ45 socket and an Ethernet network controller, a Bluetooth transceiver and controller, an IEEE 802.11 transceiver and controller, other, or a combination thereof.

The announcement device 300 further comprises a memory 304 for storing computer executable instructions for programming the announcement processing unit 302 and for storing other data related to the announcement device, like a unique identifier identifying the announcement device 300 in the evacuation network system 100.

The announcement processing unit 302 is further connected to an audio rendering module 308. The audio rendering module 308 is arranged to convert a signal received and demodulated by the modem 320 to a signal that can be reproduced by a speaker 392 as an audible signal. To this purpose, the audio rendering module 308 comprises at least an amplifier.

Furthermore, the audio rendering module 308 may comprise a digital-to-analogue converter and/or an audio decompression unit. In a preferred embodiment, the audio rendering module 308 comprises PCM/PWM (pulse code modulation/pulse width modulation) codec (coder/decoder) and the amplifier is a class D amplifier, provided with a data signal by the codec. The codec, in turn, receives data from the modem 320 via the announcement processing unit 302.

FIG. 4 shows a power supply device 400. The power supply device 400 comprises a first pair of terminals 428 comprising a first terminal 428.1 and a second terminal 428.1 and a second pair of terminals 438 comprising a first terminal 438.1 and a second terminal 438.2. The first terminals of the pairs and the second terminals of the pairs are connected via a switch 422 comprising a first MOSFET 422.1 and second MOSFET 422.2, respectively.

The power supply device 400 comprises a modem 420 that is connected to the first pair of terminals 428 via a first inductive coupling 426 and to the second pair of terminals 438 via a second inductive coupling 436. With the switch 422 being closed, i.e. is in a conductive state, the signal on the two pairs of terminals is the same. The modem 420 operates as a transceiver and is arranged for modulating and demodulating a signal comprising data to be sent and received via both pairs of terminals via both conductive couplings.

The modem 420 is coupled to a power processing unit 402 that is arranged for controlling the elements of the power supply device 400. The power processing unit 402 is coupled to a storage module 404 for storing computer executable instructions for programming the power processing unit 402 and for storing other data related to the announcement device, like a unique identifier identifying the power supply device 400 in the evacuation network system 100.

The power supply device 400 further comprises s a first DC/DC converter 466 as a voltage level control device and a second DC/DC converter 468 as a voltage control device. The first DC/DC converter 466 is coupled to a power regulation module 464.

The power regulation module 464 is connected to a power supply connector for receiving electrical power supply from any common source, like conventional 230 Volt 50 Hz or 110 Volt 60 Hz as commonly available from a wall socket. The power regulation module 464 is arranged for rectifying input voltage and current and for providing a stabilised DC voltage to the first DC/DC converter 466 and the second DC/DC converter 468. The power regulation module 464 may comprise a switched power supply or a power factor control circuit.

The DC/DC converters are also arranged to measure voltages over the terminals of the power supply device and to operate the switch 422 as discussed in conjunction with the other devices. In case either one of the DC/DC converters detects a voltage drop, caused by for example a short in a signalling line, the switch 422 and more in detail the first MOSFET 422.1 and the second MOSFET 422.2 are set in open state, which is a non-conductive state. The DC/DC converters are also switch off. Subsequently, the DC/DC converters are powered on again, while maintaining the switch 422 open to separate the first pair of terminals 428 from the second pair of terminals 438. If the DC/DC converter detects that despite offering a voltage of for example 24 Volt, the voltage level still drops below a pre-determined threshold, the DC/DC converter involved switches off. Because the switch 422 is open, the pairs of terminals are isolated from one another and a short of one pair of terminals does not have any effect on the other pair of terminals.

It is noted that though there is no conductive path anymore with the switch 422 being open between the first pair of terminals 428 and the second pair of terminals 438, the modem 420 is still inductively coupled to both pairs of terminals. Due to the galvanic separation between the terminals and the modem—and with that, with the rest of the data part of the power supply device 400—a short between terminals has no effect on the sending and receiving of data. Despite a short, or an open for that matter, modulated data may still be sent, relayed and received, depending on the way the data has been modulated.

Between the first DC/DC converter 466, the second DC/DC converter 468 and the power regulation module 464, an energy storage 456 for providing backup energy in case the power supply device 400 does not receive any energy from a mains power supply or from the evacuation network system 100. The energy storage 456 may comprise a battery, a capacitor, another energy storage device, or a combination thereof.

The power processing unit 402 is connected to a general input/output module 406. The general input/output module 306 is arranged for communicating to a wide range of devices and may comprise various connectors and controllers, like a USB socket and controller, an RS-232 socket and controller, an IEEE 1384 socket and controller, an RJ45 socket and an Ethernet network controller, a Bluetooth transceiver and controller, an IEEE 802.11 transceiver and controller, other, or a combination thereof.

Figure 5:
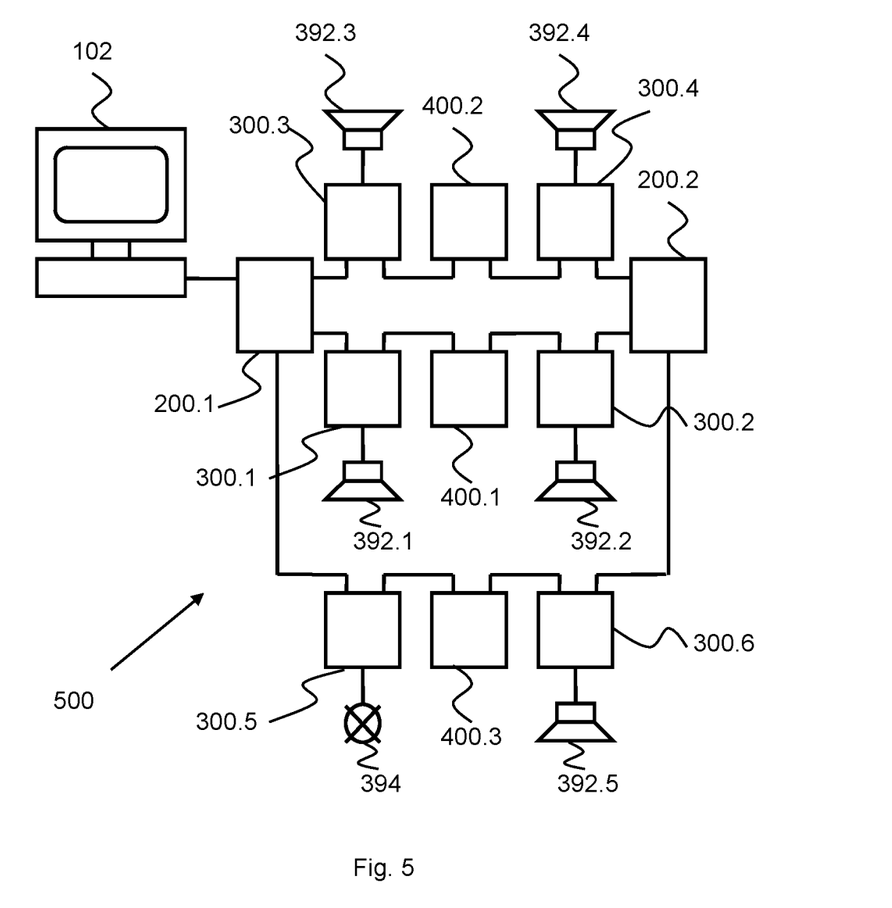
FIG. 5 shows: a second evacuation network system.

In the evacuation network system 100, the hub device 200 is arranged for controlling network traffic, the announcement device 300 is arranged for providing a signal to a speaker for providing an audible evacuation system and the power supply device 400 is arranged for providing the evacuation network system 100 with electrical power. Besides in the configuration as provided, the various elements may also be configured in a further evacuation network system 500 as depicted in FIG. 5.

In the evacuation network system 500, the first hub device 200.1 has a fifth third announcement device 300.5 connected to it via a third branch. The fifth announcement device 300.5 is connected to a third power supply device 400.3 which is in turn connected to a sixth announcement device 300.6. The sixth announcement device 300.6 is connected to the second hub device 200.2.

The various components of evacuation network system are powered by the first power supply device 400.1, the second power supply device 400.2 and the third power supply device 400.3. The power supply devices provide energy by means of a DC voltage between 15 and 32 Volt and preferably at 24 Volt. To provide proper redundancy, a power supply device is provided in each branch of the evacuation network system 500. The power is relayed by each of the components of the evacuation network system 500 and each component takes out the energy required.

For communicating data through the evacuation network system 500, the modems are provided that are inductively coupled to the terminals in each of the components. The modems provide a data signal to the inductive coupling, which results in a modulated DC signal on the various segments of signalling line between the components of the evacuation network system. The inductive couplings act as a high-pass filter, enabling the modems as well to receive a data signal available on the signalling line and filtered from the DC signal.

In normal operation as well as in evacuation operation, data messages are relayed to the various components of the evacuation network system 500. In the nodes, provided by the hub devices 200, messages are sent to a further branch depending on the component the message is intended for. As discussed above, each component has an address stored in it to uniquely identify the component in the evacuation network system.

In normal operation, test signals may be provided for selectively and individually polling the various components of the evacuation network system 500. The polling is preferably done in the first hub device 200.1. Alternatively, the polling is taken care of by the computer 102. In yet another alternative, each hub device 200 polls devices in one to three branches connected to it. Furthermore, in normal operation, also audio data may be transmitted for reproduction by the speakers 392. The audio data is sent to the announcement devices 300, in broadcast mode or by individually addressing the announcement devices 300.

In evacuation operation, evacuation instructions, by spoken messages or sirens like the slow whoop sound, are provided in data messages throughout the evacuation network system 500, either in broadcast, unicast, narrowcast, similar or a combination thereof. The data is sent around as a modulation to a DC supply voltage, which modulation is established by providing a data signal to the inductive couplings that are coupled to the signalling lines. To provide multiple messages continuously throughout the evacuation network system 500, modulation of data provided by the processing units and/or memories of the various components of the evacuation network system 500, baseband data is modulated using a spread spectrum modulation, using frequency division multiplexing (FDM).

Data is preferably modulated to a frequency band of 6 MHz, which can carry up to 300 10 kHz normal audio signals, which is sufficient for spoken text, or 150 or up to 70 high quality sound channels with 20 kHz. This way of modulating allows sending of multiple streams of audiovisual data over a signalling line. However, also other means of modulation and multiplexing may be used, including time division multiplexing, code division multiplexing, collision detection multiple access, phase shift modulation, frequency modulation, amplitude modulation, other or a combination thereof.

Signalling lines for evacuation systems comprise two electrical conductors, either shield or not, depending on legal requirements in jurisdictions where the evacuation network system 500 is to be deployed. Despite use of spread spectrum modulation, interference may still be an issue, in particular with two adjacent signalling lines provided in a busbar. Because reliability is vital in the evacuation network system 500, such crosstalk and other risk for interference should be reduced as much as possible. Therefore, the first modem 220, the second modem 230 and the third modem 240 of the hub device 200 modulate baseband data provided by the hub processing unit 202 via the data switch 210 (FIG. 2) to different frequency spectra.

Figure 6:
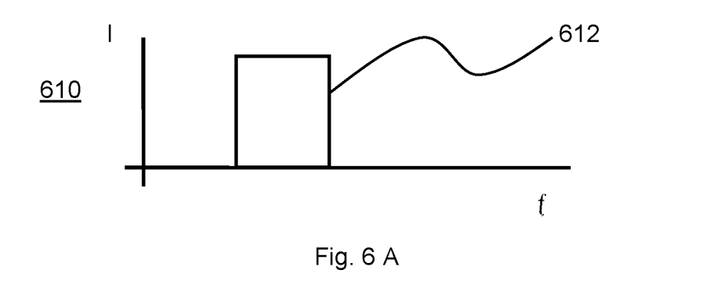

The first modem 220 modulates the baseband data to a first frequency spectrum 612 as depicted in a first intensity versus frequency graph 610, the second modem 230 modulates the baseband data to a second frequency spectrum 622 as depicted in a second intensity versus frequency graph 620 and the third modem 240 modulates the baseband data to a third frequency spectrum 632 as depicted in a third intensity versus frequency graph 630. The first frequency spectrum 612, the second frequency spectrum 622 and the third frequency spectrum 632 preferably do not overlap, providing complementary frequency spectra. This means that the data signal in each branch connected to one hub device 200 is provided in a different frequency spectrum. In this way, crosstalk between adjacent signalling lines has no effect on data integrity of data transmitted.

The first frequency spectrum 612, the second frequency spectrum 622 and the third frequency spectrum 623 may be permanently assigned to the first modem 220, the second modem 230 and the third modem 240. Alternatively, the frequency spectra are assigned during first operation of the evacuation network system 500 by means of handshake protocols.

With respect to the announcement device 300 and the power supply device 400, the modems of these devices adapt to a frequency spectrum that has been set by the hub device 200 for the branch that the announcement device 300 and the power supply device are in.

Data sent through the evacuation network system 500 can be roughly divided in two types: audio data and service data. Service data relates to operation of the various components and may include software updates for programming the processing units and the like. Audio data is only intended for the announcement devices 300. As indicated, announcement devices 300 have unique identifiers stored in them. This allows the modem 320 to filter out messages only intended for that specific announcement device. In this way, in case of emergency, audio data can be sent specifically to a specific location.

For example, the particular information is dedicated to a lift system with an instruction to remain calm and wait for help or to a room giving access to the lift system with an instruction not to use the lifts and the stairs instead. Alternatively, in case fire is only detected in a specific room, one may prefer to provide only that room with an audible alarm. Such information is in this embodiment accompanied with identification information like address information with a unique address or an address range.

If an erroneous situation occurs, the effects thereof on the evacuation network system 500 and the components thereof are limited. As discussed above, the various components are arranged for selectively isolating pairs of terminals of the components. In this way, a short between two devices may be efficiently isolated, cutting out only one piece of affected signalling line between two devices. And due to the loop architecture, data may be provided via another path in the loop. The evacuation network system 500 as depicted by FIG. 7 comprises even two loops, thus further increasing redundancy.

In case a signalling line is cut, resulting in an open, the loop is cut as well. However, the cut occurs in this case not by intervention of any of the devices of the evacuation network system 500. Therefore, no intervention of the switches of the various devices is required. Nonetheless, a cut in a signalling line is preferably confined, as a cut in a signalling line means that isolation between the two conductors is cut as well. And because this may result in a short circuit, a cut line resulting in an open is preferably isolated as well. To detect an open, it is possible to sense current through terminals, so a current sensor may be integrated in the devices.

Upon detection of such error like an open or a short, the detecting device, a hub device 200, an announcement device 300 or a power supply device 400, generate an error message by means of the processing unit and send out the error message. The error message comprises information on the type of error, a unique identifier and/or the address of the device in de evacuation network system 500, other information or a combination thereof. The error message may be broadcasted, making all other devices aware of the error and to adapt accordingly. Adapting may be rerouting of data, further isolating the anomaly in the network, other or a combination thereof.

In other words, if one of the devices of the evacuation network system 500 detects an anomaly at a pair of terminals, the respective pair of terminals is isolated, preferably no data is sent anymore via that terminal and an error signal is sent via the non-isolated pair of terminals, the error comprising an error message with an identifier of the device involved. Whereas in normal operation, signals would be passed through from a first pair of terminals to a second pair of terminals.

Alternatively, error messages are unicast by all devices to a specific device in the evacuation system network 500. Preferably, this is a hub device 200 that is connected to a central reporting unit like the computer 102 or a large messaging board with an LCD screen, indicator LEDs, other or a combination thereof.

Besides shorts and opens of terminals, also other errors may be reported, like software errors, a malfunction of the speaker 392 or other modules connected to an announcement device, like a signalling lamp 394. The reporting of this can be visualised to a central reporting unit as indicated above.

Isolator devices for a class A evacuation system are provided. The isolators each have specific address in the system. This allows the isolators to report individually with address information and status information, for example related to errors in the system and the device in particular. In an embodiment, a speaker can be connected to the device. This allows the speaker to be addressed individually so dedicated information like alarms and spoken messages can be sent to specific speakers. Dedicated isolators are available for announcing, powering the network and routing network traffic. Routers provide a possibility to create multiple loops, reducing wiring and increasing redundancy. By sending data in different branches by means of spread spectrum modulation, more data can be sent and effects of cross-talk between branches is highly reduced.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

In the description above, it will be understood that when an element such as layer, region or substrate is referred to as being "on", "onto" or "connected to" another element, the element is either directly on or connected to the other element, or intervening elements may also be present.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A router for an evacuation system comprising:
   A first router input/output module comprising a first pair of router terminals for connecting a first signalling line;
   A second router input/output module comprising a second pair of router terminals for connecting a second signalling line;
   A first router modem connected to the first router input/output module via a first coupling, A first router modem connected to the first router input/output module via a first coupling, wherein the first coupling comprises a first primary connection connected to the first pair of terminals and a first secondary connection connected to the first router modem, wherein the first primary connection being galvanically separated from the first secondary connection;
   A second router modem connected to the second router input/output module via a second coupling, wherein the second coupling comprises a second primary connection connected to the second pair of terminals and a second secondary connection connected to the second router modem, wherein the second primary connection being galvanically separated from the second secondary connection;
   A router processing unit connected to the first router modem and the second router modem for communicating data via the first router modem and the second router modem, the router processing unit being arranged to:
      instruct the first router modem to modulate the data in a first frequency spectrum; and instruct the second router modem to modulate the data in a second frequency spectrum not overlapping with the first frequency spectrum; and A router power monitoring unit for monitoring a first voltage level over the first pair of router terminals and a second voltage level over the second pair of router terminals, Wherein:

The first coupling is configured to enable the first router modem to receive a data signal available on the first signalling line that is filtered from a supply signal; and The second coupling is configured to enable the second router modem to receive a data signal available on the second signalling line that is filtered from a supply signal.

2. The router according to claim 1, wherein:
the first router modem is arranged for receiving a first signal modulated in the first frequency spectrum and for demodulating the first signal; and
the second router modem is arranged for receiving a second signal modulated in the second frequency spectrum and for demodulating the second signal.

3. The router according to claim 1, further comprising:
A third router input/output module comprising a second pair of router terminals for connecting a third signalling line; and
A third router modem connected to the third router input/output module;
The router processing unit being connected to the third router modem and further arranged to instruct the third router modem to modulate the data in a third frequency spectrum not overlapping with the first frequency spectrum and the second frequency spectrum.

4. The router according to claim 1, wherein the data comprises audio data comprising an evacuation instruction.

5. The router according to claim 1, further comprising a first power supply unit connected to the first input/output module and the second input/output module for providing electrical energy to the evacuation announcement network.

6. The router according to claim 5, further comprising a second power supply unit connected to the first input/output module and the second input/output module for providing electrical energy to the evacuation announcement network, wherein:
The first power supply unit is connected to the first input/output module and the second input/output module between the first pair of terminals on one hand and the first switch and the second switch on the other hand; and
The second power supply unit is connected to the first input/output module and the second input/output module between the second pair of terminals on one hand and the first switch and the second switch on the other hand.

7. The router according to claim 1, wherein the first coupling and the second coupling have a high-pass filter characteristic.

8. The router according to claim 7, wherein the first coupling and the second coupling is an inductive coupling.

9. The router according to claim 8, further comprising a power supply module for providing electrical energy from the evacuation system to the router connectable to the first router input/output module and to the second router input/output module for obtaining electrical energy therefrom, further comprising:
a first switch between the first pair of router terminals and the power supply module; and
a second switch between the second pair of router terminals and the power supply.

10. The router according to claim 9, wherein:
the power monitoring unit is operatively coupled to the router processing unit for providing the router processing unit with information on the first voltage level and the second voltage level; and
the router processing unit is arranged to open the first switch when the first voltage level is below a first voltage threshold and to open the second switch when the second voltage level is below a second voltage threshold.

11. The router according to claim 10, wherein:
the first switch comprises a first transistor between a first router terminal of the first pair of router terminals and the power supply module and a second transistor between a second router terminal of the first pair of router terminals and the power supply; and
the second switch comprises a third transistor between a first router terminal of the second pair of router terminals and the power supply module and a fourth transistor between a second router terminal of the second pair of router terminals and the power supply.

12. The router according to claim 10, wherein the first router modem is connected to the first pair of router terminals between the first pair of router terminals and the first switch and the second router modem is connected to the second pair of router terminals between the second pair of router terminals and the second switch.

13. The router according to claim 10, wherein a first router terminal of the first pair of router terminals is conductively connected to a first router terminal of the second pair of router terminals and a second router terminal of the first pair of router terminals is conductively connected to a second router terminal of the second pair of router terminals and the first voltage threshold is equal to the second voltage threshold.

14. The router according to claim 13, wherein the processing unit is arranged to, during start-up of the router:
Close the first switch and open the second switch;
Receive information on the first voltage level;
When the first voltage level is below the first voltage threshold, open the first switch;
Close the second switch;
Receive information on the second voltage level;
When the second voltage level is below the second voltage threshold, open the second switch.

15. A device for forming part of an evacuation announcement network, the device comprising:
A first input/output module comprising a first pair of terminals for connecting a first signalling line;
A second input/output module comprising a second pair of terminals for connecting a second signalling line;
A modem coupled to the first input/output module via a first coupling, wherein the first coupling comprises a first primary connection connected to the first pair of terminals and a first secondary connection connected to the modem, and coupled to the second input/output module via a second coupling, wherein the second coupling comprises a second primary connection connected to the second pair of terminals and a second secondary connection connected to the modem, wherein the first pair of terminals is connected to the second pair of terminals via at least a first switch;
A processing unit connected to the modem for communicating data via the modem; and
A power monitoring unit configured to monitor voltage level at the first pair of terminals and the second pair of terminals and control the at least first switch to disconnect at least one of the first pair of terminals from at least one of the second pair of terminals;

Wherein:
The primary connections are galvanically separated from the secondary connections and the couplings are configured to enable the modem to receive a data signal available on the first signalling line and/or the second signalling line that is filtered from a supply signal; and A first terminal of the first pair of terminals is connected to a first terminal of the second pair of terminals and a second terminal of the first pair of terminals is connected to a second terminal of the second pair of terminals via a first switch.

16. The device according to claim 15, wherein the modem is arranged to modulate a frequency spectrum of a signal received via the first input/output module or the second output module.

17. The device according to claim 15, further comprising a rendering unit arranged to process communicated data for reproduction as an audible signal by a speaker.

18. The device according to claim 15, wherein the first coupling and the second coupling have a high-pass filter characteristic.

19. The device according to claim 15, wherein the first coupling and the second coupling is an inductive coupling.

20. The device according to the claim 15, wherein the power monitoring unit is configured to monitor a first voltage level of the first pair of terminals and a second voltage level over the second pair of terminals;
Wherein:
The power monitoring unit is operatively coupled to the processing unit for providing the processing unit with information on the first voltage level and the second voltage level; and
The processing unit is arranged to open the at least first switch when the first voltage level is below a first voltage threshold or when the second voltage level is below a second voltage threshold.

21. The device according to claim 20, further comprising a second switch provided between a first terminal of the first pair of terminals and a first terminal of the second pair of terminals and wherein:
the processing unit is arranged to open the second switch when the first voltage level is below a first voltage threshold or when the second voltage level is below a second voltage threshold.

* * * * *